H. HICKMAN.
Corn Planter.
No. 102,818. Patented May 10, 1870.
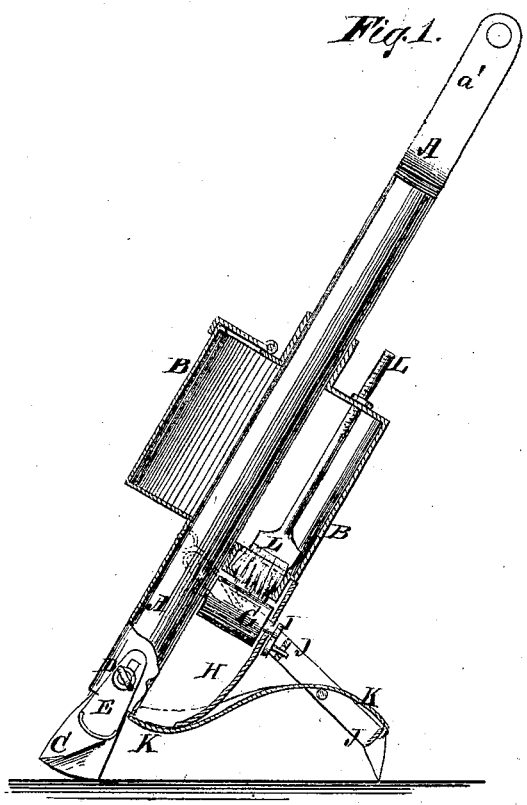
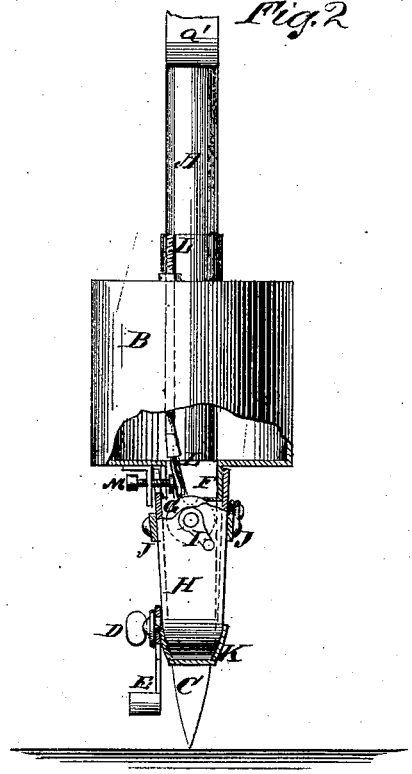
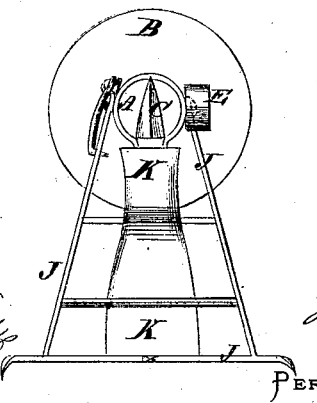
Witnesses:
Inventor:
H. Hickman

United States Patent Office.

HENRY HICKMAN, OF OMAHA, NEBRASKA.

Letters Patent No. 102,818, dated May 10, 1870.

IMPROVEMENT IN HAND CORN-PLANTERS.

The Schedule referred to in these Letters Patent and making part of the same.

*To all whom it may concern:*

Be it known that I, HENRY HICKMAN, of Omaha, in the county of Douglas and State of Nebraska, have invented a new and useful Improvement in Hand Corn-Planter; and I do hereby declare that the following is a full, clear, and exact description thereof, which will enable others skilled in the art to make and use the same, reference being had to the accompanying drawings forming part of this specification, in which—

Figure 1 is a side view of my improved corn-planter, partly in section, to show the construction.

Figure 2 is a rear view of the same, partly in section, to show the construction.

Figure 3 is a bottom view of the same.

Similar letters of reference indicate corresponding parts.

My invention has for its object to furnish an improved hand corn-planter, which shall be simple in construction, and effective in operation, and which shall be adapted for planting in sod or in plowed land, as may be desired; and It consists in the construction and combination of the various parts of the planter, as hereinafter more fully described.

A is the handle, which may have a hand-piece, a', formed upon or attached to it.

B is the seed-box or hopper, which is attached to the handle A, and from which the seed passes to the dropping-device.

C is the knife, by means of which the ground is opened to receive the corn.

The knife C is made in about the shape shown in figs. 1, 2, and 3, and with a square shank, which enters a square socket in the lower end of the handle A, and is secured in place by the set-screw D, which passes in through the side of the handle A, and the forward end of which enters a cross-groove or notch in the knife-shank.

In planting in sod, the knife C is adjusted as shown in figs. 1, 2, and 3; but, in planting in old or plowed land, the said knife is turned one-quarter around two sides of the square shank, being grooved or notched to receive the point of the screw D, so that the knife may be held securely in either position.

The depth to which the knife C enters the ground is regulated by the gauge E, attached to the side of the lower end of the handle A by the screw D, which said screw passes through a slot in the said gauge, so that the gauge can be conveniently raised and lowered, as required.

F is a small cup or recess, placed beneath or formed in the bottom of the seed-box B.

An opening is formed in the bottom of the cup or recess F, beneath which is pivoted the dropping-wheel or cylinder G, which has a recess formed in its upper side to receive the seed from the cup F, and discharge it into the conductor-spout H, by which it is conducted into the channel made in the ground by the knife C.

The dropping-wheel or cylinder G is pivoted to the conductor-spout H, and upon the end of its rear journal is formed, or to it is attached, a small crank, I, the crank-pin of which enters a slot in the cross-bar of the pivoted fulcrum-frame J. The forward end of the fulcrum-frame J is pivoted to the handle A or conductor-spout H, and upon its rear end are formed teeth to take hold of the ground, and prevent it from slipping.

K is a plate attached to the fulcrum-frame J, and so formed that when the said frame J is in its ordinary position the forward end of the said plate K may cover the lower end of the conductor-spout H, and prevent the clogging of the conducting-spout with dirt. As the frame J moves back, or rather as the lower end of the handle A moves forward in operating the planter, the dropping-cylinder G is revolved to discharge the seed into the conductor-spout H, and the plate K is removed from the lower end of said spout, allowing the seed to pass to the ground.

L is a brush, the stem of which passes up through the stationary part of the top or cover of the seed-box B, and has a screw-thread cut upon it to receive the nut, by means of which the brush may be adjusted vertically, to compensate for the wear. The lower part of the brush L passes through the opening in the bottom of the cup or recess F, and rests upon the dropping-wheel or cylinder G, to prevent any more seed than enough to fill the recess in the cylinder G from being carried out by said cylinder.

The brush L is adjusted laterally by the set-screw M, which works in a bracket attached to the bottom of the seed-box B, and which has a button or plate attached or swiveled to its forward end, which button or plate rests against the side of the said brush, as shown in fig. 2.

In using the planter, the knife C is thrust vertically into the ground, and the upper end of the handle A is moved rearward and downward, bringing the rear end of the fulcrum-frame in contact with the ground, and forcing the knife C forward through the ground, opening a channel to receive the seed. At the same time, and by the same movement, the dropping device is operated to drop the seed into the channel opened by the knife C. As the knife C is withdrawn from the ground, its broad rear edge displaces enough soil from the sides of the channel to cover the said seed. As the planter is withdrawn from the ground the fulcrum-frame J is brought back to its ordinary position by the spring N, connected with said frame, and with the handle A or conductor-spout, as shown in figs. 1, 2, and 3.

Having thus described my invention, I claim as new and desire to secure by Letters Patent—

1. The adjustable knife C, constructed as described, in combination with the handle, seed-box, and dropping device of a hand corn-planter, substantially as herein shown and described, and for the purpose set forth.

2. The combination of the pivoted fulcrum-frame J with the handle and knife of a hand corn-planter, substantially as herein shown and described, and for the purpose set forth.

3. The combination of the dropping-wheel or cylinder G and crank I with the pivoted fulcrum-frame J, conductor-spout H, and recess F of the seed-box B, substantially as herein shown and described, and for the purpose set forth.

4. The combination of the brush L, adjustable vertically and laterally with the seed-box B, recess F, and dropping-wheel or cylinder G, substantially as herein shown and described, and for the purpose set forth.

HENRY HICKMAN.

Witnesses:
WM. WALLAR,
G. E. BARGER.